(12) United States Patent
Blackman

(10) Patent No.: US 7,989,980 B2
(45) Date of Patent: Aug. 2, 2011

(54) PORTABLE SELF REGENERATING POWER SYSTEM

(76) Inventor: Tracy D. Blackman, Havana, FL (US)

( * ) Notice: Subject to any disclaimer, the term of this patent is extended or adjusted under 35 U.S.C. 154(b) by 553 days.

(21) Appl. No.: 12/006,644

(22) Filed: Jan. 4, 2008

(65) Prior Publication Data

US 2008/0211452 A1 Sep. 4, 2008

Related U.S. Application Data

(60) Provisional application No. 60/904,418, filed on Mar. 2, 2007.

(51) Int. Cl.
*H02J 7/34* (2006.01)
*H02J 3/38* (2006.01)
*H02J 3/32* (2006.01)
*H02J 7/14* (2006.01)

(52) U.S. Cl. ............... 307/19; 307/47; 307/48; 320/105

(58) Field of Classification Search .................. 320/101, 320/107, 123, 104, 105; 290/1 R; 307/9.1, 307/19, 47, 48; 322/10, 18, 34; 361/600, 361/601
See application file for complete search history.

(56) References Cited

U.S. PATENT DOCUMENTS

| | | | | |
|---|---|---|---|---|
| 4,300,087 A | | 11/1981 | Meisner | |
| 4,316,095 A | * | 2/1982 | Laffoon et al. | 290/38 R |
| 4,672,296 A | | 6/1987 | Griffin | |
| 5,066,866 A | * | 11/1991 | Hallidy | 290/1 R |
| 5,077,513 A | * | 12/1991 | Dea et al. | 320/115 |
| 5,162,720 A | * | 11/1992 | Lambert | 320/104 |
| 5,339,956 A | * | 8/1994 | Thomason | 206/372 |
| 5,606,244 A | * | 2/1997 | Migdal | 322/7 |
| 5,810,168 A | * | 9/1998 | Eggering | 206/372 |
| 5,982,138 A | | 11/1999 | Krieger | |
| 6,202,776 B1 | * | 3/2001 | Masberg et al. | 180/65.22 |
| 6,222,342 B1 | * | 4/2001 | Eggert et al. | 320/105 |
| 6,326,764 B1 | * | 12/2001 | Virtudes | 320/101 |
| 6,466,024 B1 | * | 10/2002 | Rogers | 324/427 |
| 6,476,509 B1 | * | 11/2002 | Chen et al. | 290/1 R |
| 6,636,015 B1 | * | 10/2003 | Levine et al. | 320/105 |
| 6,660,967 B2 | * | 12/2003 | Brofft et al. | 219/133 |
| 6,724,100 B1 | * | 4/2004 | Gabriel | 307/9.1 |
| 7,057,376 B2 | * | 6/2006 | Cook et al. | 323/207 |
| 7,205,745 B2 | | 4/2007 | Murashige et al. | |
| 7,245,111 B2 | * | 7/2007 | Montgomery et al. | 322/45 |
| 7,388,348 B2 | * | 6/2008 | Mattichak | 320/101 |
| 2004/0164716 A1 | * | 8/2004 | Walter et al. | 322/8 |
| 2005/0225288 A1 | * | 10/2005 | Cole et al. | 320/114 |

(Continued)

*Primary Examiner* — Richard V Muralidar

(57) ABSTRACT

An energy storage system, more particularly to a power distribution system for providing power for an indeterminate period of time. The power distribution system comprises means for converting the energy from an alternator to AC/DC circuits. The alternator transmits electric current to a battery, where an inverter is electrically connected to the battery and transmits AC power to low-load circuits. A DC control panel is connected to the battery and transmits electric current from the battery to low-load DC circuits. The power system is part of a portable toolbox. The system is connected to a vehicle's charging system or any mechanism having a alternator a first battery an engine and a starting system an would continually recharge it self. The battery for the system is connected to the alternator of a vehicle and or mechanism through an isolator, or connected directly to the alternator or battery of the vehicle and or mechanism and would transmit a direct electric current to the battery for the system which stores the charge. The inverter is electrically connected to the battery for the system and transmits an electric current from the battery to one or more low-load circuits.

5 Claims, 2 Drawing Sheets

U.S. PATENT DOCUMENTS

| | | | |
|---|---|---|---|
| 2006/0028169 A1* | 2/2006 | Winn | 320/107 |
| 2006/0170218 A1* | 8/2006 | Grant et al. | 290/1 R |
| 2007/0024236 A1* | 2/2007 | Arakelian | 320/107 |
| 2007/0024237 A1* | 2/2007 | Cole et al. | 320/107 |
| 2007/0247108 A1* | 10/2007 | Brown | 320/107 |

* cited by examiner

PORTABLE SELF REGENERATING POWER SYSTEM

RELATED APPLICATION

This application is related to and claims priority of Provisional Application Ser. No. 60/904,418, filed Mar. 2, 2007, by the Applicant hereof, where the entire contents thereof are incorporated herein by reference.

FIELD OF THE INVENTION

This invention is directed to the field of portable power distribution systems, more particularly to a retrofittable power distribution system for delivering AC and DC power circuits.

BACKGROUND OF THE INVENTION

The present invention relates to a portable self regenerating power distribution tool system for on-site job locations. The easy portability of the system allows contractors, and the like, to readily position where power is needed, whether it be AC or DC. Typically construction sites employ large power generating systems which are not amenable to relocating the system at positions where needed. The prior art includes a variety of portable power generating systems but they are limited in power and time of service as they are not regenerating as found with the present invention. A number of such prior art systems are described and illustrated in the following U.S. Patents:

a.) U.S. Pat. No. 4,300,087, to Meisner, teaches a portable power supply that includes a rechargeable battery in a casing. Power is supplied from the battery to a socket by means of a DC/AC voltage converter and a step-up transformer. When the socket is connected to an external source of power, the battery is charged by means of an additional winding in the transformer and a rectifier.

b.) U.S. Pat. No. 4,672,296, to Griffin discloses a mobile emergency medical vehicle having a main transport engine and a medical equipment, supply and patient compartment or module. The compartment has an independently operated electrical generating means powered by an auxiliary engine capable of providing all of the electrical power requirements of the compartment including exterior and interior electrical lighting, vacuum generating means, power outlet means, compartment air-conditioning, heating and he like. The electrical generating means is capable of supplying both 115 volt AC and 12 volt DC power through a converter to the compartment. Switching means is provided to facilitate switching at least a portion of the 12 volt DC power requirements of the patient compartment including exterior and interior lighting and vacuum generating means to the electrical system of the main transport engine upon failure of the compartment electrical generating means or auxiliary engine for any reason. The vehicle provides greater electrical capacity and reliability for mobile medical equipment and support systems to a self-sustaining patient compartment for ease of maintenance and servicing and resulting fail-safe operation.

c.) U.S. Pat. No. 5,077,513, to Des et al., covers a portable battery power source that includes a frame with a pair of upwardly angled support members, a battery supporting tray for holding a source battery, a pair of suspension members extending upwardly from the tray for connecting the tray to the pair of support members attached to a wheel-mounted frame. Panels form the frame and also a housing for protecting the source battery from the elements. The power source housing also has a cable compartment for holding a set of cables for connecting the source battery to an electrical load and space for a charging circuit used for recharging the source battery when it is not in use and a control panel at which the device's functions are controlled.

d.) U.S. Pat. No. 5,982,138, to Krieger, is directed to a portable electrical energy source including a portable housing having an outer surface and defining an interior space. A direct current battery is disposed in the interior space. A direct current socket is supported on the housing and electrically coupled to the battery for supplying direct current from the battery to a device outside the housing. An inverter is provided for converting direct current into alternating current and includes an electrical lead have a male plug adapted for being electrically connected to the battery via the direct current socket and an electrical outlet for supplying alternating electrical current to a device outside the housing. The inverter is removably attached to the outer surface of the housing so that the inverter can be ported together with the battery inside the housing and selectively separated from the housing and used independently of the battery in the housing.

e.) U.S. Pat. No. 7,205,745, to Murashige et al., relates to a portable power source system comprising a battery pack for accommodating at least one secondary battery and a mounting part for mounting the battery pack. The mounting part is disposed in power using equipment, where the battery pack comprises a charge circuit having a charge terminal and a discharge circuit with a discharge terminal. The charge circuit comprises a control circuit for controlling a voltage and a current during charging, the mounting part comprises a protruding external terminal for connecting with the discharge terminal, and the battery pack comprises an inserting part for inserting the external terminal. The discharge terminal is disposed in a concealed position inside the inserting part. The battery pack is movable from an initial position to a fixing position while the external terminal has been inserted in the inserting part, and connection between the external terminal and the discharge terminal is achieved at the fixing position.

A review of such patents and other portable systems reveal the shortcomings of the respective systems. The instant invention overcomes these shortcomings in a manner that will become apparent in the description and drawings which follow. For instance, it represents an improvement on the longevity of known generators and the ability to collect renewable energy.

SUMMARY OF THE INVENTION

This invention is directed to a portable self-regenerating power system for job site locations where power is needed. The power distribution system includes a means for supplying energy or electrical power to the system for an indeterminate period of time. The power distribution system further comprises a means for converting the energy from an alternator to selected AC/DC circuits. The alternator transmits an electric current to a battery and whereas the inverter is electrically connected to the battery and transmits an electric current from the battery to low load circuits. As such, the present invention acts as an energy storage system. The power system is part of a portable tool box system. The system may be connected to a vehicle charging system and would continually recharge itself.

Accordingly, a feature of this invention is the provision of a portable power regenerating system, especially for on site construction projects.

Another feature hereof is the provision of a means for converting energy from an alternator to selected AC/DC circuits.

A further feature of the invention is the provision of an energy storage system.

These and other features of the invention will become clearer from the description and drawings which follow.

DETAILED DESCRIPTION OF PREFERRED EMBODIMENT

Figure 1:
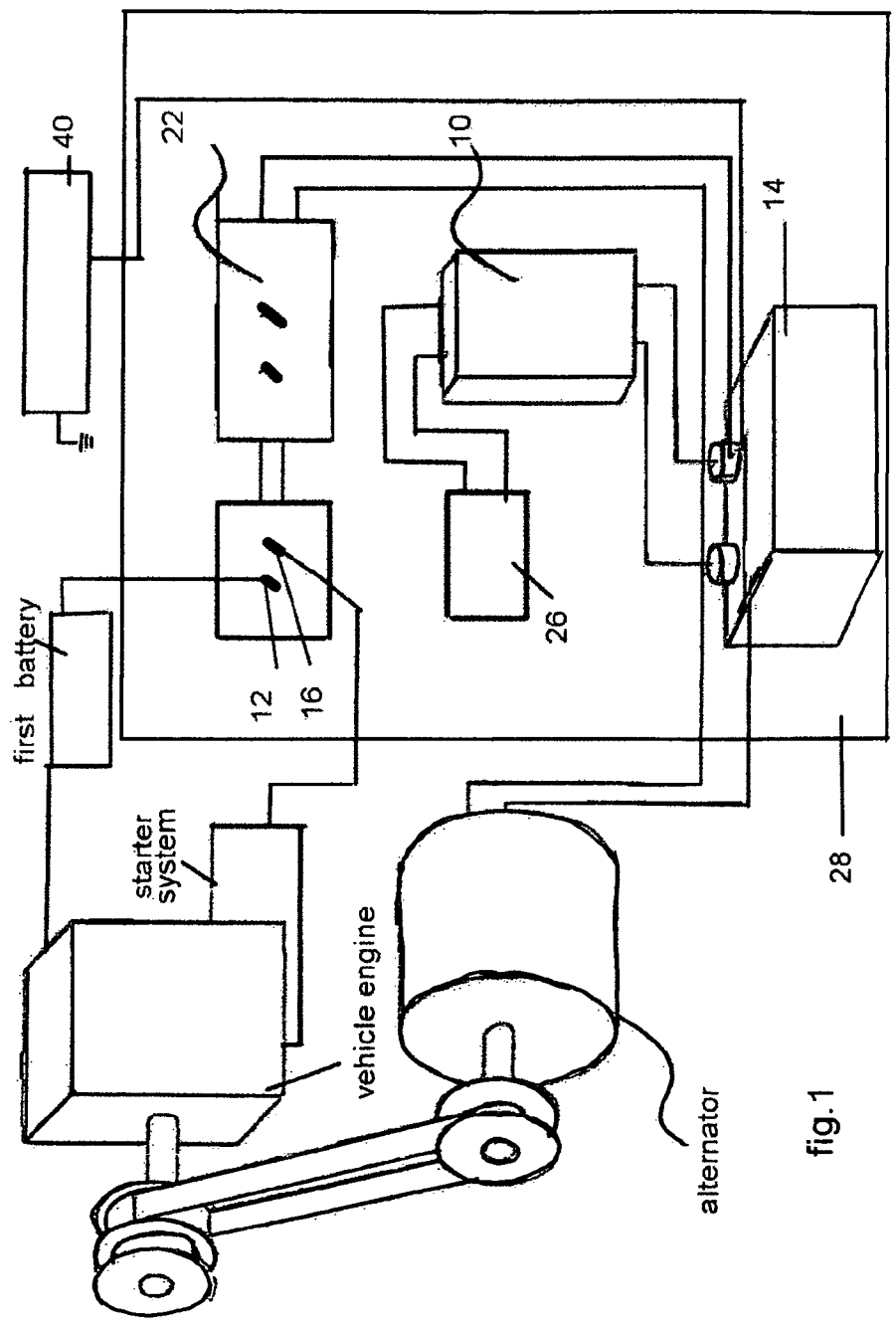
FIG. 1 is a simplified schematic diagram illustrating the critical components forming the self regenerating system of this invention, including further secondary components and their relationship to the full system hereof.

This invention covers an energy storage system in the form of a portable self-regenerating power mechanism that is ideally suited for on-site job locations, such as construction sites. The mechanism includes a means for converting the energy from an alternator to selected AC/DC circuits. The invention will now be described with regard to the accompanying drawings, where like reference numeral represent like components in the respective drawings.

Figure 2:
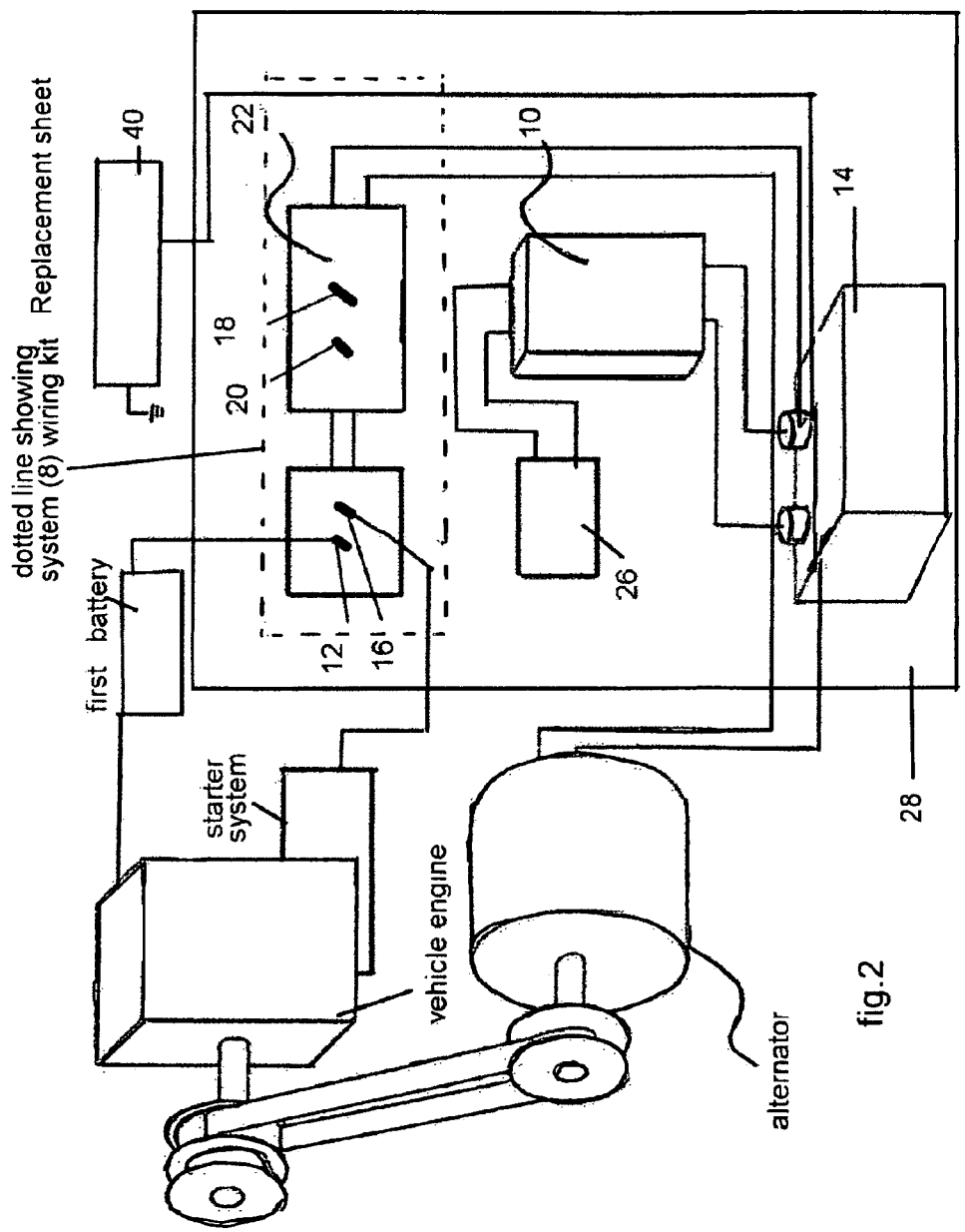
FIG. 2 is a perspective view showing the system of the invention, particularly the portability of the self regenerating power toolbox hereof.

Turning now to FIGS. 1 and 2, illustrating respectively a schematic diagram representing the components forming the self-regenerating power mechanism 8, of the invention, and a portable toolbox 28 for transporting the system of the invention to on-site construction locations, by way of an exemplary use. The system hereof comprises a second battery 14, at least one inverter 10, a DC fuse breaker 42, and a charger controller 44 electrically connected to second battery 14 which may be inside or outside the toolbox 28, inside the dotted line now showing the preferred components of mechanism 8 and the toolbox 28. Further components including one or more AC power outlets 26, inside the toolbox and accessible to its exterior, and one or more DC power ports, for charging battery powered tools and or providing DC power. Additionally, the toolbox has a solar panel 40, as known in the art, and connected to the battery 14 to help keep the battery at full charge. The inverter 10 is electrically connected to the battery 14 and transmits an electric current from the battery 14 to low-load circuits and AC power outlets 26. These circuits and AC power outlets are suitable for powering low loads and for charging batteries for tools, such as battery powered skill saw, jigsaw, and similar tools. Mechanism 8, now will be referred to as system 8

A DC control panel 22 may also be connected to the battery 14 that sends an electric current from the battery 14 to a low-load DC circuits. The power system 8 hereof is made to be portable, as evident in FIG. 2, to be portable and have power available at a job site whenever needed. The power system 8 will connect to any alternator 46 as known in the art, to transmit a direct electric current to the second battery 14 which stores the electric charge. The low-load circuits may include low-wattage to power tools, televisions, computers, lighting, and the like. The battery 14 runs a direct current to the inverter 10, which converts the DC input to 110 VAC. This is relatively "clean" low wattage AC power that is suitable to the above noted low-loads.

The portable self-regenerating power system 8 may be controlled by timer 16 and key switch 12, where such components may be optional. To operate, the user may turn on the key switch 12 when power is needed. The switch then would power the timer 16 so as to start the vehicles engine 52 at different times automatically to keep the battery 14 at full charge. That is, the switch 12 would be connected to the vehicle's battery 54, first battery and starter 56. When the vehicle is started up and the engine 52 is running, the operator would get DC power from the alternator 46 where this power is sent to the second battery 14. This would allow the operator to store energy in the battery 14 and to send power through the inverter 10 to the low-load circuits 26. Circuits 26, or any AC outlets can also be used for charging batteries for cordless power tools. DC control panel 22, electrically connected to battery 14, provides DC power to various DC devices such as a cigarette lighter 18, and power ports 20. The power ports may be used for DC powered devices and charging batteries that are used for cordless power tools, i.e. cordless drills and flashlight.

It is recognized that changes, modification and modifications may be made to the power system hereof, especially by those skilled in the art, without departing from the spirit and scope thereof. The system may be put together as a kit for example; system 8 and said alternator may be pre-wired to retrofit a vehicle and improve pre-existing toolboxes.

Retractable outlet cord to facilitate connections at remote locations. Accordingly, no limitation is intended to be imposed thereon except as set forth in the accompanying claims.

I claim:

1. A portable self-regenerating power system (8) that produces AC power and stores DC power for supplying electricity to tools and devices at work sites, that is configured to be electrically connected to a vehicle, wherein the vehicle includes a vehicle alternator, a battery, an engine, and a starting system, the portable self-regenerating power system (8) comprising:
   a) a box (28) mountable on the vehicle for housing the portable self-regenerating power system (8) and having additional space for storage, the box (28) containing a DC control panel (22), a DC to AC inverter (10), a second battery (14), an on/off key switch (12) and a timer (16);
   b) the DC control panel (22) electrically connecting the second battery (14), the DC to AC inverter (10), the on/off key switch (12) and the timer (16), the DC control panel (22) further comprising a DC output (18) for supplying the devices with DC power;
   c) an energy collecting solar panel (40) for charging the second battery (14),
   d) the on/off key switch (12) and timer (16) is mounted on the DC control panel (22) and is configured to electrically connect the first battery and the starting system to start and run the engine for a predetermined time in order to recharge the second battery (14) from the vehicle alternator, and stop the engine after the second battery (14) is recharged;
   e) the DC to AC inverter (10) comprising AC power outlets (26) for supplying AC power to the tools from the DC to AC inverter (10), the second battery (14) and the alternator;
   f) the box (28) housing the portable self-regenerating power system (8) is configured to electrically connect to the vehicle alternator and the first battery which operates under the control of the on/off key switch (12) and timer (16) to energize the DC control panel (22), the DC to AC inverter (10) and the second battery (14) to supply power through the DC to AC inverter (10), and to recharge the second battery (14) to store power to be used when the vehicle is not running.

2. The portable self-regenerating power system (8) according to claim 1, wherein the energy collecting Solar panel (40) is externally connected mounted on the box (28), the energy collecting Solar panel (40) being removable.

3. The portable self-regenerating power system (8) according to claim 1, wherein the DC output (18) and AC power outlets (26) are external of the box (28).

4. The portable self-regenerating power system (8) according to claim 1, wherein the DC control panel (22) further comprises a 12-V cigarette lighter power port for at least one power consuming load.

5. A portable self-regenerating power system (8) wiring kit configured to be interfaced to a vehicle's electrical system, wherein the vehicle's electrical system includes a vehicle alternator, a battery, an engine, and a starting system, the portable self-regenerating power system (8) comprising:
   a) a box (28) for housing the portable self-regenerating power system (8), the box (28) mounting to the vehicle and electrically connecting to the vehicle alternator through the wiring kit,
   b) the box (28) containing a plastic DC control panel (22), a DC to AC inverter (10), a second battery (14);
   c) the plastic DC control panel (22) further comprising an on/off key switch (12), a timer (16), a DC power port (20) and a 12-V cigarette lighter (18) for supplying devices with DC power;
   d) the on/off key switch (12) and the timer (16) electrically connects the first battery and the starting system to start the engine for a predetermined time in order to recharge the second battery (14) from the vehicle alternator, and stop the engine after the second battery (14) has recharged for a predetermined time;
   e) AC power outlets (26) for supplying AC power to tools from the DC to AC inverter (10), the second battery (14) and the alternator;
   e) the second battery (14) being recharged selectively from the vehicle alternator and an energy collecting solar panel (40) interfaced to the wiring kit;
   f) the second battery (14) supplying power through the DC to AC inverter (10), and storing power to be used when the vehicle is not running.

* * * * *